(12) United States Patent
Sudou et al.

(10) Patent No.: US 7,183,020 B2
(45) Date of Patent: Feb. 27, 2007

(54) SEPARATOR FOR BATTERY AND LITHIUM ION BATTERY USING THE SAME

(75) Inventors: Yasuhiro Sudou, Sodegaura (JP); Hironori Suzuki, Tokyo (JP); Satoru Nagami, Tokyo (JP); Kazuo Ikuta, Handa (JP); Takahiko Yamamoto, Obu (JP); Shun Okijima, Anjo (JP); Satoru Suzuki, Nagoya (JP); Hiroshi Ueshima, Anjo (JP)

(73) Assignees: Mitsui Chemicals, Inc., Tokyo (JP); Denso Corporation, Aichi (JP)

( * ) Notice: Subject to any disclaimer, the term of this patent is extended or adjusted under 35 U.S.C. 154(b) by 26 days.

(21) Appl. No.: 11/202,567

(22) Filed: Aug. 12, 2005

(65) Prior Publication Data

US 2006/0073389 A1    Apr. 6, 2006

(30) Foreign Application Priority Data

Aug. 13, 2004  (JP) .............................. 2004-235775

(51) Int. Cl.
*H01M 2/16*    (2006.01)
*B29C 43/24*   (2006.01)

(52) U.S. Cl. .................... 429/249; 429/142; 264/46; 264/54

(58) Field of Classification Search ................ 429/142, 429/249; 264/46, 54
See application file for complete search history.

(56) References Cited

U.S. PATENT DOCUMENTS

| | | | | |
|---|---|---|---|---|
| 4,734,196 A | * | 3/1988 | Kono et al. ............ | 210/500.36 |
| 5,830,554 A | * | 11/1998 | Kaimai et al. .............. | 428/131 |
| 2004/0248012 A1 | * | 12/2004 | Pekala ........................ | 429/250 |

FOREIGN PATENT DOCUMENTS

| JP | 2002-222464 | * | 5/2003 |
|---|---|---|---|
| JP | 2003-142064 | * | 5/2003 |

* cited by examiner

*Primary Examiner*—Mark Ruthkosky
(74) *Attorney, Agent, or Firm*—Amin, Turocy & Calvin, LLP

(57) ABSTRACT

A battery separator of the invention is obtained by press forming a meltblown nonwoven fabric comprising 4-methyl-1-pentene polymer or a 4-methyl-1-pentene/α-olefin copolymer, the battery separator having an average fiber diameter of 0.8 to 5 μm, a basis weight of 9 to 30 g/m², a porosity of 30 to 60%, and a load at 5% elongation in the MD direction (longitudinal direction) of not less than 1.2 (kg/5 cm width). A lithium ion secondary battery of the invention includes the battery separator.

2 Claims, 1 Drawing Sheet

SEPARATOR FOR BATTERY AND LITHIUM ION BATTERY USING THE SAME

BACKGROUND OF THE INVENTION

1. Field of the Invention

The present invention relates to battery separators. More particularly, the invention relates to battery separators made from 4-methyl-1-pentene (co)polymer and excellent in heat resistance properties, strength and elasticity, and to lithium ion batteries having the separators.

2. Related Art

Separators in lithium ion batteries must separate positive electrodes and negative electrodes to prevent short circuits, and must allow passage of electrolytes or ions. Porous films and nonwoven fabrics of resins are known separators. The lithium ion battery separators are also required to exhibit stable properties even at high temperatures such as in charging, and therefore high heat resistance is desired.

Nowadays, polyethylene sheets manufactured by a drawing process or phase separation method have been in practical use as the lithium ion battery separators composed of porous films, and porous films of ultra high molecular weight polyethylene are known. Porous films of high-melting point polyolefins, polyethyleneterephthalate and nylons have been proposed for enabling uses at high temperatures, but manufacturing porous films from high-melting point resins is difficult.

On the other hand, nonwoven fabric separators are suited for mass production and possess advantageous high porosity and lightweight, so that various nonwoven fabrics and separators using thereof having high heat resistance and small pore diameters have been studied.

For example, JP-A-2002-124238 proposes a high heat resistance separator made of polymethylpentene meltblown nonwoven fabric. Further, JP-A-2003-142064 discloses a separator that is thin but sufficient in mechanical strength and possesses superior shape retention at elevated temperatures, being composed of a porous fiber sheet that has a specific thickness and porosity and comprises a branched α-olefin polymer such as 4-methyl-1-pentene polymer.

These nonwoven fabric separators, however, are still insufficient in strength when subjected to tension during battery manufacture such as wound-type batteries, resulting in width reduction that is a shrinkage of sheet in a direction perpendicular to the pulling direction. The reduced width of the separator leads to insufficient insulation between both battery electrodes in the area, and may cause short circuits. Further, the separator stretched in the pulling direction is enlarged in pore size and the possibility of micro-short circuits is increased.

The present inventors have made intensive studies in view of the above circumstances, and have found that meltblown nonwoven fabrics have microscopic variation of basis weight in different parts. This variation changes little even after the meltblown nonwoven fabrics are pressed or embossed with metal rolls or press plates. Accordingly, the meltblown nonwoven fabrics or pressed products thereof used as separators cause microscopic nonuniform passage of electrolytes or ions in different parts. Therefore, it is expected that more uniform pore diameters and diameter distribution will reduce the internal resistance.

There has therefore been a need for a separator that can exhibit heat resistance and mechanical strength enough to retain its shape during manufacture and use of lithium ion batteries, and has excellent insulating properties, fine pores and high productivity.

SUMMARY OF THE INVENTION

Problems to be Solved by the Invention

It is an object of the invention to provide a battery separator that has high initial elongation-resistance strength, excellent heat resistance and insulating properties, little heat shrinkage and high productivity, and a lithium ion secondary battery using the separator.

Means for Solving the Problems

The battery separator according to the present invention is obtained by press forming a meltblown nonwoven fabric comprising 4-methyl-1-pentene polymer or a 4-methyl-1-pentene/α-olefin copolymer, the battery separator having an average fiber diameter of 0.8 to 5 µm, a basis weight of 9 to 30 $g/m^2$, a porosity of 30 to 60%, and a load at 5% elongation in a MD direction (machine direction: longitudinal direction) of not less than 1.2 (kg/5 cm width). The lithium ion secondary battery of the invention includes the battery separator.

Effects of the Invention

The present invention can provide a battery separator that has high initial elongation-resistance strength, excellent heat resistance and insulating properties, little heat shrinkage and high productivity, and a secondary battery having the separator.

Figure 1:
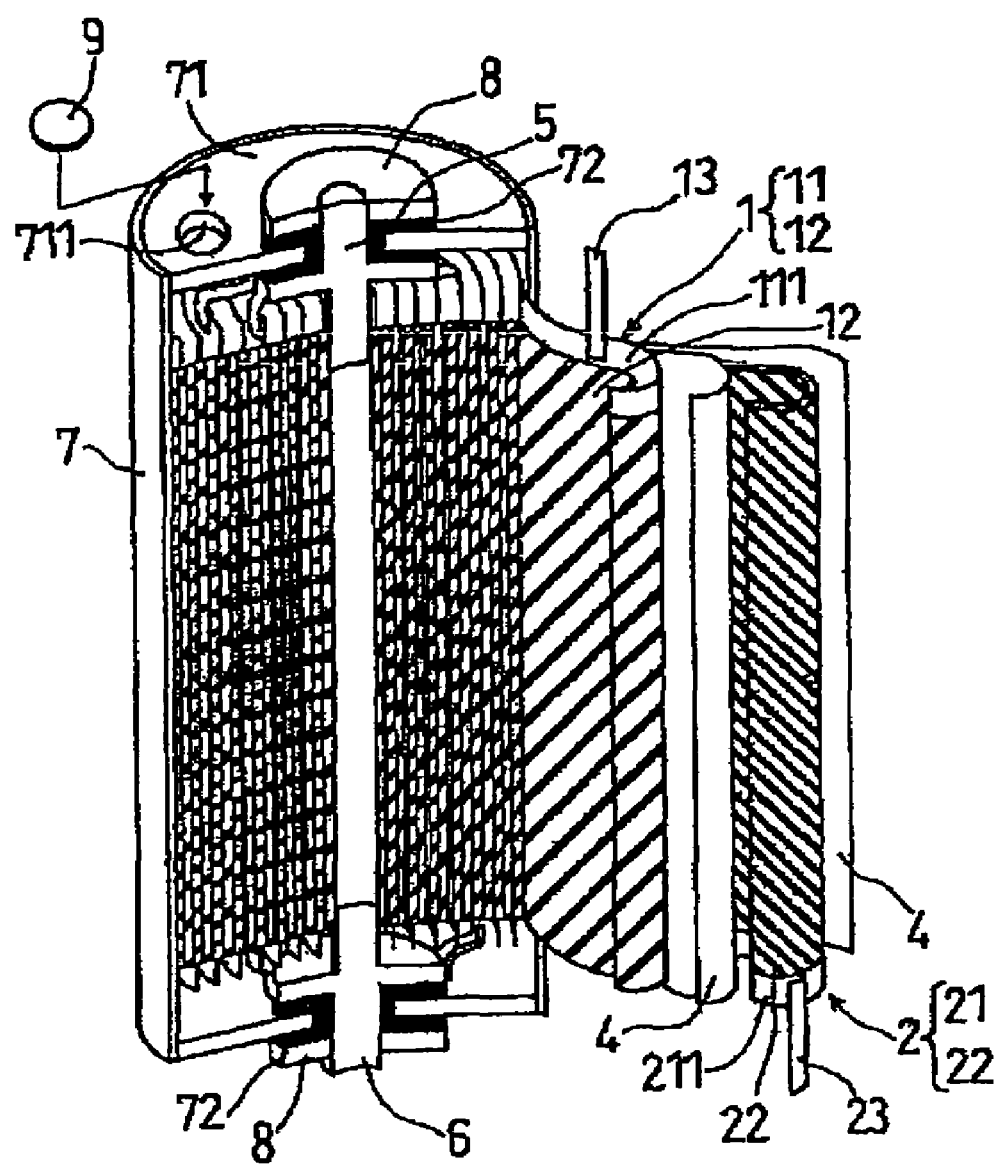
FIG. 1 illustrates a structure of lithium ion secondary batteries fabricated in Examples and Comparative Examples.

1: Positive electrode
2: Negative electrode
4: Separator
5: Positive electrode terminal
6: Negative electrode terminal
7: Battery can
8: Screw nut
9: Sealing plug
11, 21: Collector
13, 23: Lead
12, 22: Mixture member
111, 211: Uncoated portion
71: Lid plate
72: Gasket
711: Pouring opening

DISCLOSURE OF THE INVENTION

The lithium ion battery separator according to the present invention is made of a meltblown nonwoven fabric of 4-methyl-1-pentene homopolymer or a 4-methyl-1-pentene/α-olefin copolymer. The α-olefins for the 4-methyl-1-pentene/α-olefin copolymers are preferably those of 2 to 20 carbon atoms.

The 4-methyl-1-pentene/C2–20 α-olefin copolymer is preferably a random copolymer. The C2–20 α-olefins to be copolymerized with 4-methyl-1-pentene include ethylene, propylene, 1-butene, 1-hexene, 1-octene, 1-decene, 1-dodecene, 1-tetradecene, 1-hexadecene, 1-octadecene and 1-eicosene. The copolymer may contain one or two or more kinds of the α-olefins.

In view of heat resistance and mechanical properties, the 4-methyl-1-pentene/α-olefin copolymer desirably contains 4-methyl-1-pentene at 80 to 99.9 wt %, preferably 90 to 99.9 wt %, and the copolymer component α-olefin at 0.1 to 20 wt %, preferably 0.1 to 10 wt %. Particularly preferably, the copolymer is a random copolymer of 4-methyl-1-pentene and one or two or more kinds of the α-olefins having 10 to 20 carbon atoms, particularly one or two or more α-olefins selected from 1-decene, 1-dodecene, 1-tetradecene, 1-hexadecene, 1-octadecene and 1-eicosene.

In view of processability into meltblown nonwoven fabrics and mechanical strength of porous films, the 4-methyl-1-pentene polymer or 4-methyl-1-pentene/α-olefin copolymer desirably has a melt flow rate at 260° C. and 5 kg load of about 100 to 1000 g/10 min, preferably about 150 to 500 g/10 min, and a melting point of about 210 to 280° C., preferably about 230 to 250° C. Furthermore, the 4-methyl-1-pentene polymer or 4-methyl-1-pentene/α-olefin copolymer used as raw material of the lithium ion battery separator of the invention desirably has a Vicat softening point (ASTM D 1525) of not less than 140° C., preferably not less than 160° C., more preferably not less than 170° C. The 4-methyl-1-pentene polymer or 4-methyl-1-pentene/α-olefin copolymer having this Vicat softening point can give a nonwoven fabric sheet showing good heat resistance.

The 4-methyl-1-pentene polymer or 4-methyl-1-pentene/α-olefin copolymer may be produced using a stereospecific catalyst by a known method.

The lithium ion battery separator of the invention is made of a meltblown nonwoven fabric of the 4-methyl-1-pentene polymer or 4-methyl-1-pentene/α-olefin copolymer. The meltblown nonwoven fabric as raw material of the lithium ion battery separator desirably ranges in average fiber diameter from 0.8 to 5 μm, preferably from 1 to 3 μm, and in basis weight from 9 to 30 g/m$^2$, preferably from 10 to 25 g/m$^2$, more preferably from 10 to 20 g/m$^2$. The average fiber diameter in the above range leads to nonwoven fabrics having microscopic pores and permits smooth and high-productivity spinning and fabrication of nonwoven fabrics by meltblowing. The basis weight in the above range can prevent lithium ion batteries from shorting and can achieve low internal resistance.

The lithium ion battery separator of the invention may be obtained by press forming the meltblown nonwoven fabric. Press forming means to manufacture the lithium ion battery separator is not particularly limited, provided that the press forming means can apply pressure in the thickness direction of the meltblown nonwoven fabric. Press forming means preferred for use has an elastic and high frictional coefficient part that is contacted with at least one surface of the meltblown nonwoven fabric during the pressing. The elastic contacting part of the press forming means preferably has an elastic modulus of 20 to 600 kg/cm , more preferably 20 to 300 kg/cm$^2$. Examples of the materials having elasticity and high frictional coefficient include paper, cottons, wood, rubbers and plastic foams. The rubbers include urethane rubbers, styrene-butadiene rubbers, olefin elastomers, thermoplastic elastomers and silicon rubbers.

Methods of press forming include those in which the meltblown nonwoven fabric is pressed using a press machine that has an elastic pressing surface such as is made of a rubber and a metal pressing surface such as is made of stainless steel; in which the meltblown nonwoven fabric is calendered using calendar rolls that include an elastic roll such as is made of a rubber and a hard roll such as is made of a metal, or a pair of elastic rolls; and in which the meltblown nonwoven fabric sandwiched between rubber sheets or the like is pressed or rolled.

When the pressing part brought into contact with one surface of the meltblown nonwoven fabric is made of a material with elasticity and high frictional coefficient, and the other part is fabricated of a hard material, the elastic pressing part preferably has low thermal conductivity and the hard pressing part preferably possesses high thermal conductivity. Examples of the hard materials include metals such as stainless steel. In particular, the lithium ion battery separator of the invention may be manufactured by pressing with calendar rolls including an elastic roll and a hard roll, which is industrially advantageous in that the manufacturing is simple and can easily produce long lithium ion battery separators. Also preferably, the hard roll may be Teflon®-coated to provide higher releasability from the roll.

The press forming is preferably accompanied by heating. The temperature and pressure conditions may be selected such that meltblown fibers will be fusion bonded via at least part thereof to form a nonwoven fabric sheet having desired pore diameters. The pressure and temperature conditions in the press forming may be determined appropriately based on the knowledge of the skilled person depending on the surface material of the pressing means such as rolls. For example, depending on the properties of the raw material 4-methyl-1-pentene polymer or 4-methyl-1-pentene/α-olefin copolymer, the conditions may be selected such that the pressing part that contacts with at least one surface of the meltblown nonwoven fabric will be about 80 to 230° C., preferably about 150 to 200° C. When the pressing means has a metallic pressing part for one surface of the meltblown nonwoven fabric and a rubber pressing part for the other surface, the temperature conditions may be such that the metallic pressing part will be about 120 to 200° C. and the rubber pressing part will be about 90 to 170° C. When the pressing involves rolls, the roll surface temperature should fall in the above range.

If the temperature and pressure in the pressing are too high, the fibers are excessively fusion bonded with each other and the pores are shut down, and the lithium ion battery separator obtained causes an extremely increased internal resistance and is often unusable. When the temperature and pressure are too low, the pressing cannot produce sufficiently microscopic pores and the separator obtained has low elongation resistance and poor strength.

The lithium ion battery separator of the invention ranges in average fiber diameter from 0.8 to 5 μm, preferably from 1 to 3 μm, and in basis weight from 9 to 30 g/m$^2$, preferably from 10 to 20 g/m$^2$. The average fiber diameter and basis weight are substantially the same before and after the pressing. The lithium ion battery separator desirably has a porosity of 30 to 60%, preferably 40 to 50%, and a thickness of, although not particularly limited to, about 15 to 60 μm, preferably about 20 to 45 μm. The lithium ion battery separator having this porosity provides low internal resistance and does not pass electrode substances to prevent short circuits. The thickness in the above range is suitable for the separator to be applied to small-sized lithium ion batteries.

The lithium ion battery separator of the invention possesses superior shape retention and stretch resistance. Specifically, the load at 5% elongation in the MD direction (longitudinal direction) (initial elongation-resistance strength) is not less than 1.2 (kg/5 cm width), preferably not less than 1.5 (kg/5 cm width). The load at 5% elongation in the MD direction (longitudinal direction) is a load required to achieve 5% elongation from the original length when a nonwoven fabric 5 cm in the TD direction (transverse direction: width direction) is elongated in the MD direction (longitudinal direction). The lithium ion battery separator meeting this property is highly resistant to tension applied in the wind-up after manufacturing and during use, and is little deformed such as is reduced in width even when subjected to tension-entailing applications, for example battery production involving winding.

The lithium ion battery separator of the invention is excellent in heat resistance, has little heat shrinkage and is unlikely to cause short circuits even if the temperature is increased during operation. Accordingly, the battery separator can permit safe use of lithium ion secondary batteries.

Also preferably, the lithium ion battery separator has a dense-non dense structure across the thickness, in which case the separator has layers of fibers strongly fusion bonded or tangled with each other and thereby exhibits superior shape retention for the average density and has a higher load at 5% elongation in the MD direction (longitudinal direction) (initial elongation-resistance strength). The dense-non dense structure may be any of those in which the lithium ion battery separator has a high density near one surface and a low density near the other surface; in which the lithium ion battery separator has a high density near the both surfaces and a low density inside; and in which the lithium ion battery separator has a low density near the both surfaces and a high density inside. Preferred is a structure in which the porosity near at least one surface is lower than the average porosity of the entire nonwoven fabric. Such dense structures can be achieved by controlling the aforementioned press forming conditions.

The lithium ion battery separator possesses sufficient mechanical strength and superior shape retention, and is therefore suited for use in lithium ion secondary batteries manufactured while applying tension to the separator. Furthermore, the lithium ion battery separator is made of the 4-methyl-1-pentene polymer or 4-methyl-1-pentene/α-olefin copolymer, and is therefore capable of superior shape retention at high temperatures. Accordingly, the battery separator is not deformed during battery operation and prevents short circuits in the battery. Thus, the separator enables production of high-safety lithium ion secondary batteries.

The lithium ion secondary battery according to the present invention includes the aforementioned lithium ion battery separator. Because of the separator having high shape retention and heat resistance, the lithium ion secondary batteries can be manufactured in high yield with reduced percentage of defective products having deformed separators, and can permit increased speed of battery manufacture because the separator can undergo higher tension than has been possible heretofore. Furthermore, the lithium ion secondary battery is free of internal short circuits attributed to a separator having large pores, and will not have internal short circuits even when the temperature has increased during use. Further, because of the separator having sufficient performance even the separator having small thickness, the lithium ion secondary battery can be reduced in weight and size.

The separator of the present invention may be applied to secondary batteries other than the lithium ion secondary batteries, and to primary batteries.

EXAMPLES

The present invention will be hereinafter described in greater detail by Examples, but it should be construed that the invention is in no way limited to those Examples.

In Examples and Comparative Examples, measurements and evaluations were performed in the following manners.

Load at 5% Elongation in MD Direction (Longitudinal Direction)

A nonwoven fabric 50 mm in width (transverse direction or width direction) was fixed with chucks 100 mm apart and was elongated in the MD direction (longitudinal direction) at a stress rate of 300 mm/min, and the load (stress) at 5% elongation was measured with Instron universal tester.

Evaluation of Battery Short Circuits

Twenty lithium ion secondary batteries were charged at constant current and voltage of 1 mA/cm$^2$ and 4.2 V, respectively, until the charging current became 50 μA or below. Any voltage disturbance that occurred during the charging was considered short circuits. The rate of occurrence of short circuits at less than 10% was evaluated as "A", at 10–30% was evaluated as "B", at 30–50% was evaluated as "C", and at 50% or above was evaluated as "D". The charging had a current direction such that Li$^+$ions were doped on the negative electrode.

Example 1

A 4-methyl-1-pentene copolymer (trade name: TPX DX820 manufactured by Mitsui Chemicals, Inc., melting point: 240° C., melt flow rate at 260° C. and 5 kg load: 180 g/10 min) was spun by a meltblowing method at a resin temperature of 350° C. and a spinning air rate (amount of air used for spinning 1 kg of resin) of 60 Nm$^3$/kg, and the fibers were collected on a web former to give a nonwoven fabric web with a basis weight of 10 g/m$^2$. The average fiber diameter of the nonwoven fabric web was 1.4 μm. The nonwoven fabric web obtained was pressed with a calender roll apparatus that included a rubber roll having a surface temperature of 150° C. (elastic modulus: 300 kg/cm$^2$) and a steel roll having a surface temperature of 180° C. Thus, a lithium ion battery separator having properties shown in Table 1 was obtained.

Subsequently, a lithium ion secondary battery illustrated in FIG. 1 was manufactured using the lithium ion battery separator as described below.

A positive electrode 1 consisted of a 15 μm thick aluminum foil collector whose both surfaces were coated with a mixture applied and press bonded thereto, the mixture member being a paste obtained by kneading together 85 parts by weight of lithium nickelate as active material, 10 parts by weight of acetylene black as conductive material, and 5 parts by weight of polyvinylidene fluoride as binder. A negative electrode 2 consisted of a 10 μm thick copper foil collector whose both surfaces were coated with a mixture member applied and press bonded thereto, the mixture member being a paste obtained by kneading together 92.5 parts by weight of carbon as active material, and 7.5 parts by weight of polyvinylidene fluoride as binder. The positive electrode 1 and negative electrode 2 each had an uncoated portion free of the mixture member. Aluminum leads 13 and copper leads 23 were bonded by ultrasonic welding to the surface of uncoated portion 111 of the positive electrode collector 11 and the surface of uncoated portion 211 of the negative electrode collector 21, respectively, for passing electrical current from the electrodes to a positive electrode terminal 5 and a negative electrode terminal 6.

Thereafter, a separator 4 cut wide to prevent direct contact of the positive and negative electrodes 1 and 2 was placed between the positive electrode 1 and the negative electrode 2. They were then spirally wound to form a wound electrode unit. The separator used herein was the nonwoven fabric sheet 1 prepared as described hereinabove.

Subsequently, the leads 13 and 23 attached to the positive electrode 1 and negative electrode 2, respectively, were gathered and bundled, and they were bonded to the respective positive electrode terminal 5 and negative electrode terminal 6 by ultrasonic welding. The unit was then put in a battery can 7, and gaskets 72 were placed between the positive electrode terminal 5 and a lid plate 71 and between the negative electrode terminal 6 and the battery can 7, followed by fixing with screw nuts 8. The lid plate 71 and the battery can 7 were then laser welded together under welding conditions ensuring air and liquid tightness.

The thus-fabricated battery including the electrode unit in the battery can was then placed in a drying oven and was stored at a reduced pressure of 133 Pa and 120° C. for 8 hours. Thereafter, an electrolyte pouring opening 711 previously provided in the lid plate 71 was temporarily sealed with an EPDM sealing member, and the battery was transported to an electrolyte pouring apparatus. After the sealing member had been removed, a nonaqueous electrolyte was poured through the electrolyte pouring opening 711 of the lid 71. The nonaqueous electrolyte used herein was a solution of lithium hexafluorophosphate in a 3:7 by weight solution of ethylene carbonate and diethylene carbonate. After a predetermined amount of the electrolyte had been poured, the pouring opening 711 was hermetically sealed with a sealing plug 9 to provide a battery. The evaluation results of the battery are given in Table 1.

Example 2

A 4-methyl-1-pentene copolymer (trade name: TPX DX820 manufactured by Mitsui Chemicals, Inc., melting point: 240° C., melt flow rate at 260° C. and 5 kg load: 180 g/10 min) was spun by a meltblowing method at a resin temperature of 340° C. and a spinning air rate (amount of air used for spinning 1 kg of resin) of 60 Nm$^3$/kg, and the fibers were collected on a web former to give a nonwoven fabric web with a basis weight of 15 g/m$^2$. The average fiber diameter of the nonwoven fabric web was 2.6 µm. The nonwoven fabric web obtained was pressed with a calender roll apparatus that included a rubber roll having a surface temperature of 150° C. (elastic modulus: 300 kg/cm$^2$) and a steel roll having a surface temperature of 180° C. Thus, a lithium ion battery separator having properties shown in Table 1 was obtained.

Subsequently, a lithium ion secondary battery illustrated in FIG. 1 was manufactured as described in Example 1, using the lithium ion battery separator obtained above. The evaluation results of the lithium ion secondary battery are given in Table 1.

Example 3

A 4-methyl-1-pentene copolymer (trade name: TPX DX820 manufactured by Mitsui Chemicals, Inc., melting point: 240° C., melt flow rate at 260° C. and 5 kg load: 180 g/10 min) was spun by a meltblowing method at a resin temperature of 340° C. and a spinning air rate (amount of air used for spinning 1 kg of resin) of 60 Nm$^3$/kg, and the fibers were collected on a web former to give a nonwoven fabric web with a basis weight of 21 g/m$^2$. The average fiber diameter of the nonwoven fabric web was 2.4 µm. The nonwoven fabric web obtained was pressed with a calender roll apparatus that included a rubber roll having a surface temperature of 150° C. (elastic modulus: 300 kg/cm$^2$) and a steel roll having a surface temperature of 180° C. Thus, a lithium ion secondary battery separator having properties shown in Table 1 was obtained.

Subsequently, a lithium ion secondary battery illustrated in FIG. 1 was manufactured as described in Example 1, using the lithium ion battery separator obtained above. The evaluation results of the battery are given in Table 1.

Examples 4–8

A 4-methyl-1-pentene copolymer (trade name: TPX DX820 manufactured by Mitsui Chemicals, Inc., melting point: 240° C., melt flow rate at 260° C. and 5 kg load: 180 g/10 min) was spun by a meltblowing method at a resin temperature of 370° C. in Example 4, 360° C. in Examples 5 and 8, 350° C. in Examples 6, and 345° C. in Example 7, and the fibers were collected on a web former to give a nonwoven fabric web with a basis weight of 12.5 g/m$^2$. The average fiber diameters of the nonwoven fabric webs are set forth in Table 1. The nonwoven fabric web obtained was pressed with a calender roll apparatus to afford a lithium ion secondary battery separator with properties given in Table 1. Examples 4 to 7 employed a calender roll apparatus that included a pair of rubber rolls having a surface temperature of 168° C. (elastic modulus: 300 kg/cm$^2$), and Example 8 used a calender roll apparatus that included a rubber roll having a surface temperature of 124° C. (elastic modulus: 300 kg/cm$^2$) and a Teflon®-coated steel roll having a surface temperature of 124° C.

Subsequently, a lithium ion secondary battery illustrated in FIG. 1 was manufactured as described in Example 1, using the lithium ion battery separator obtained above. The evaluation results of the batteries are given in Table 1.

Example 9

A nonwoven fabric web was produced and pressed to afford a lithium ion secondary battery separator with properties given in Table 1, in the same manner as in Example 5 except that the basis weight was 9 g/m$^2$.

Subsequently, a lithium ion secondary battery illustrated in FIG. 1 was manufactured as described in Example 1, using the lithium ion battery separator obtained above. The evaluation results of the battery are given in Table 1.

Comparative Example 1

A nonwoven fabric web was prepared in the same manner as in Example 2, and was pressed with a calender roll apparatus that included a pair of 100° C. steel rolls. Thus, a lithium ion battery separator having properties shown in Table 2 was obtained.

Subsequently, a lithium ion secondary battery illustrated in FIG. 1 was manufactured as described in Example 1, using the lithium ion battery separator obtained above. The evaluation results of the battery are given in Table 2.

Comparative Example 2

A 4-methyl-1-pentene copolymer (trade name: TPX DX820 manufactured by Mitsui Chemicals, Inc., melting point: 240° C., melt flow rate at 260° C. and 5 kg load: 180 g/10 min) was spun by a meltblowing method at a resin temperature of 350° C. and a spinning air rate (amount of air used for spinning 1 kg of resin) of 60 Nm$^3$/kg, and the fibers were collected on a web former to give a nonwoven fabric web with a basis weight of 15 g/m$^2$. The average fiber diameter of the nonwoven fabric web was 1.3 µm. The nonwoven fabric web obtained was pressed in the same manner as in Comparative Example 1 to afford a lithium ion battery separator having properties shown in Table 2.

Subsequently, a lithium ion secondary battery illustrated in FIG. 1 was manufactured as described in Example 1, using the lithium ion battery separator obtained above. The evaluation results of the battery are given in Table 2.

Comparative Example 3

A lithium ion battery separator was fabricated in the same manner as in Comparative Example 1, except that the calender roll apparatus included a pair of steel rolls having a surface temperature of 180° C.

Subsequently, a lithium ion secondary battery illustrated in FIG. 1 was manufactured as described in Example 1, using the lithium ion battery separator obtained above. The evaluation results of the battery are given in Table 2.

Comparative Example 4

A 4-methyl-1-pentene copolymer (trade name: TPX DX820 manufactured by Mitsui Chemicals, Inc., melting point: 240° C., melt flow rate at 260° C. and 5 kg load: 180 g/10 min) was spun by a meltblowing method at a resin temperature of 330° C. and a spinning air rate (amount of air used for spinning 1 kg of resin) of 60 $Nm^3$/kg, and the fibers were collected on a web former to give a nonwoven fabric web with a basis weight of 15 $g/m^2$. The average fiber diameter of the nonwoven fabric web was 6 μm. The nonwoven fabric web obtained was pressed in the same manner as in Example 1 to afford a lithium ion battery separator having properties shown in Table 2.

Subsequently, a lithium ion secondary battery illustrated in FIG. 1 was manufactured as described in Example 1, using the lithium ion battery separator obtained above. The evaluation results of the battery are given in Table 2.

Comparative Example 5

A lithium ion battery separator with properties shown in Table 2 was obtained by spinning and pressing in the same manner as in Example 2 except that the basis weight was 40 $g/m^2$.

Subsequently, a lithium ion secondary battery illustrated in FIG. 1 was manufactured as described in Example 1, using the lithium ion battery separator obtained above. The evaluation results of the battery are given in Table 2.

Comparative Example 6

A nonwoven fabric web was fabricated as described in Example 2, and was pressed with a calender roll apparatus that included a rubber roll having a surface temperature of 168° C. and a steel roll having a surface temperature of 180° C. Thus, a lithium ion battery separator having properties shown in Table 2 was obtained.

Subsequently, a lithium ion secondary battery illustrated in FIG. 1 was manufactured as described in Example 1, using the lithium ion battery separator obtained above. The evaluation results of the lithium ion secondary battery are given in Table 2.

Comparative Example 7

A nonwoven fabric web was fabricated as described in Example 2, and was pressed with a calender roll apparatus that included a rubber roll having a surface temperature of 150° C. (elastic modulus: 300 $kg/cm^2$) and a steel roll having a surface temperature of 150° C. Thus, a lithium ion battery separator having properties shown in Table 2 was obtained.

Subsequently, a lithium ion secondary battery illustrated in FIG. 1 was manufactured as described in Example 1, using the lithium ion battery separator obtained above. The evaluation results of the lithium ion secondary battery are given in Table 2.

TABLE 1

| | Ex. 1 | Ex. 2 | Ex. 3 | Ex. 4 | Ex. 5 | Ex. 6 | Ex. 7 | Ex. 8 | Ex. 9 |
|---|---|---|---|---|---|---|---|---|---|
| Separator material | PMP nonwoven fabric | PMP nonwoven fabric | PMP nonwoven fabric | PMP nonwoven fabric | PMP nonwoven fabric | PMP nonwoven fabric | PMP nonwoven fabric | PMP nonwoven fabric | PMP nonwoven fabric |
| Basis weight ($g/m^2$) | 10 | 15 | 21 | 12.5 | 12.5 | 12.5 | 12.5 | 12.5 | 9 |
| Average fiber diameter (μm) | 1.4 | 2.6 | 2.4 | 0.8 | 1.2 | 1.4 | 1.8 | 1.2 | 1.2 |
| Calender roll material | Rubber/Steel | Rubber/Steel | Rubber/Steel | Rubber/Rubber | Rubber/Rubber | Rubber/Rubber | Rubber/Rubber | Rubber/Teflon[*] | Rubber/Rubber |
| Steel roll temperature (° C.) | 180 | 180 | 180 | — | — | — | — | 124[*] | — |
| Rubber roll temperature (° C.) | 150 | 150 | 150 | 168 | 168 | 168 | 168 | 124 | 168 |
| Load at 5% elongation in MD (kg/5 cm) | 1.5 | 1.7 | 2.5 | 2.6 | 1.6 | 1.7 | 1.2 | 1.3 | 1.2 |
| Porosity (%) | 43 | 44 | 44 | 40 | 40 | 40 | 40 | 40 | 40 |
| Thickness (μm) | 21 | 32 | 45 | 25 | 25 | 25 | 25 | 25 | 18 |
| Battery short circuit evaluation | A | A | A | A | A | A | A | A | A |
| Voltage decrease in self-discharge (mV) | 26 | 16 | 10 | 16 | 16 | 16 | 16 | 16 | 16 |
| Internal resistance (1 kHz) (mΩ) | 38 | 40 | 44 | 39 | 40 | 41 | 41 | 41 | 37 |

[*]Teflon-coated steel roll

TABLE 2

|  | Comp. Ex. 1 | Comp. Ex. 2 | Comp. Ex. 3 | Comp. Ex. 4 | Comp. Ex. 5 | Comp. Ex. 6 | Comp. Ex. 7 |
| --- | --- | --- | --- | --- | --- | --- | --- |
| Separator material | PMP nonwoven fabric | PMP nonwoven fabric | PMP nonwoven fabric | PMP nonwoven fabric | PMP nonwoven fabric | PMP nonwoven fabric | PMP nonwoven fabric |
| Basis weight (g/m$^2$) | 15 | 15 | 15 | 15 | 40 | 15 | 15 |
| Average fiber diameter (μm) | 2.6 | 1.3 | 2.6 | 6 | 2.6 | 2.6 | 2.6 |
| Calender roll material | Steel/Steel | Steel/Steel | Steel/Steel | Rubber/Steel | Rubber/Steel | Rubber/Steel | Rubber/Steel |
| Steel roll temperature (° C.) | 100 | 100 | 180 | 180 | 180 | 180 | 150 |
| Rubber roll temperature (° C.) | — | — | — | 150 | 150 | 168 | 150 |
| Load at 5% elongation in MD (kg/5 cm) | 0.8 | 1.1 | 1.9 | 1.7 | 4.5 | 1.9 | 1.0 |
| Porosity (%) | 44 | 44 | 10 | 44 | 44 | 21 | 69 |
| Thickness (μm) | 32 | 32 | 20 | 32 | 86 | 23 | 58 |
| Battery short circuit evaluation | D | C | A | C | A | A | B |
| Voltage decrease in self-discharge (mV) | 230 | 120 | 1 | 100 | 16 | 16 | 70 |
| Internal resistance (1 kHz) (mΩ) | 31 | 35 | >1000 | 40 | 100 | 65 | 44 |

The invention claimed is:

1. A battery separator obtained by press forming a melt-blown nonwoven fabric comprising 4-methyl-1-pentene polymer or a 4-methyl-1-pentene/α-olefin copolymer, the battery separator having an average fiber diameter of 0.8 to 5 μm, a basis weight of 9 to 30 g/m$^2$, a porosity of 30 to 60%, and a load at 5% elongation in the MD direction (longitudinal direction) of not less than 1.2 (kg/5 cm width).

2. A lithium ion secondary battery including the battery separator claimed in claim 1.

* * * * *